April 18, 1950     F. H. TARLTON     2,504,904
CHANGE-SPEED GEAR FOR MOTOR VEHICLES
Filed Aug. 11, 1947     5 Sheets-Sheet 4
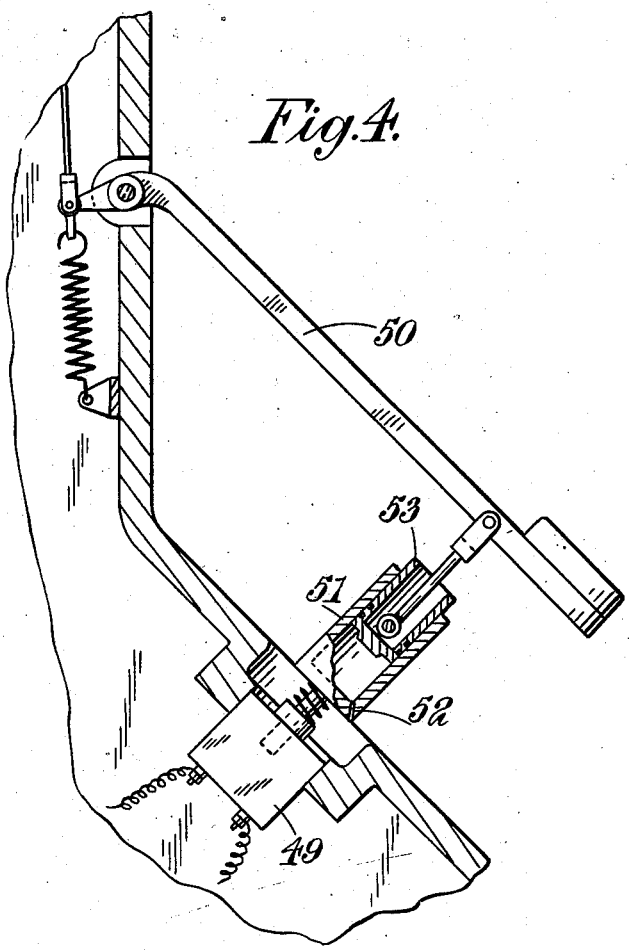
INVENTOR
FRANK H. TARLTON
by Wilkinson Mawhinney
ATTORNEYS April 18, 1950  F. H. TARLTON  2,504,904
CHANGE-SPEED GEAR FOR MOTOR VEHICLES
Filed Aug. 11, 1947  5 Sheets-Sheet 5
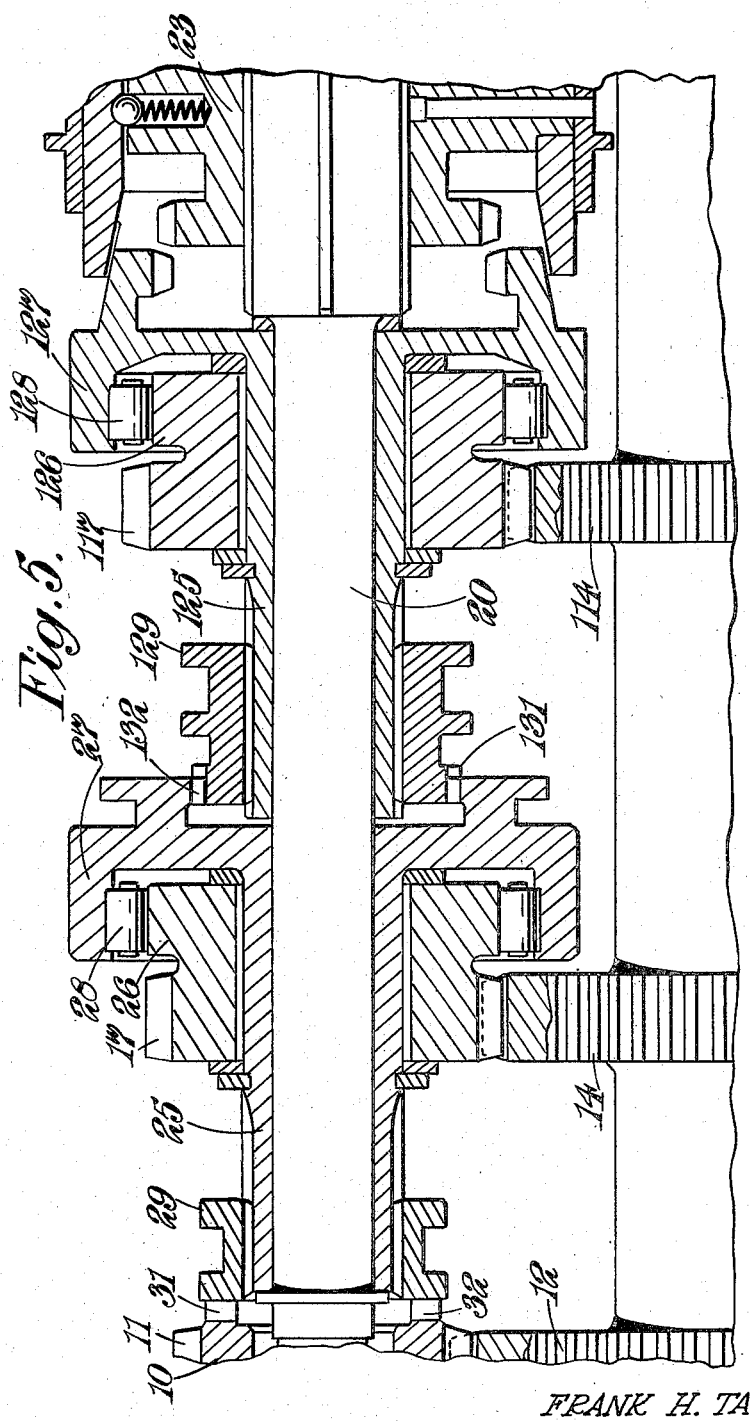
INVENTOR
FRANK H. TARLTON
by Wilkinson & Mawhinney
ATTORNEYS Patented Apr. 18, 1950

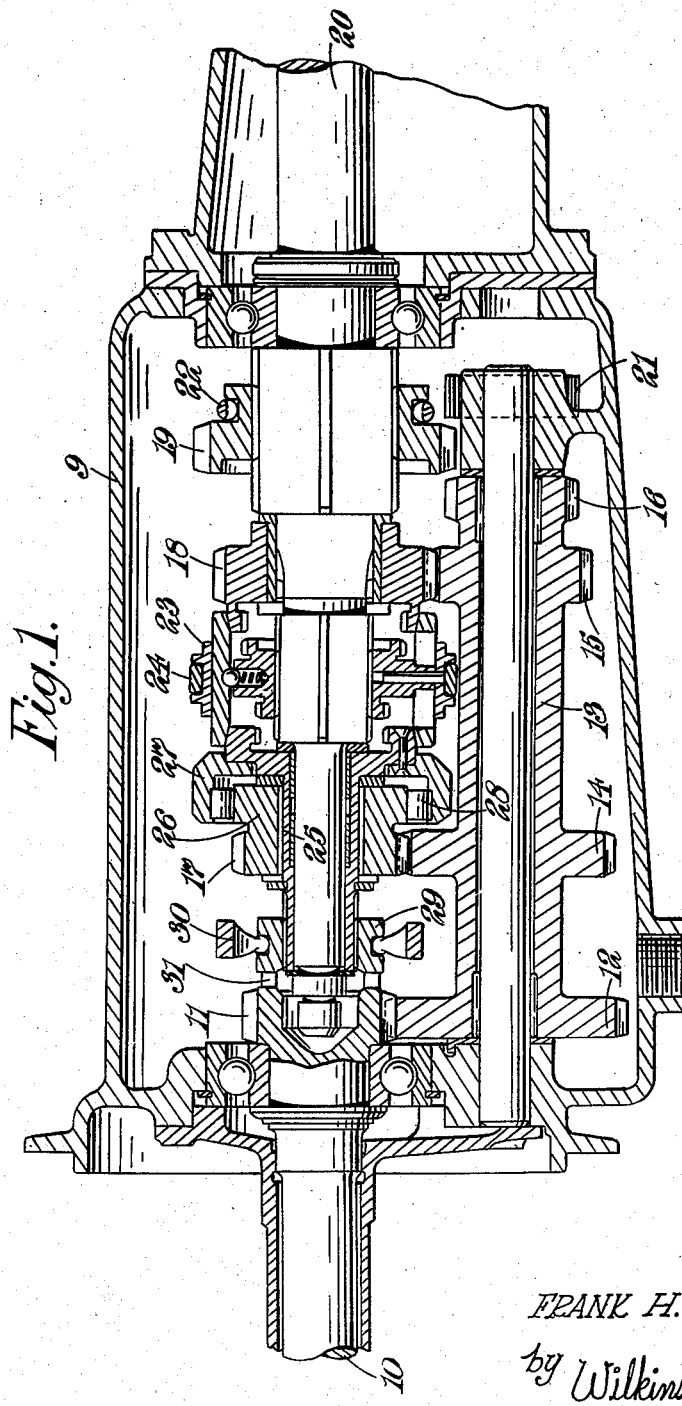

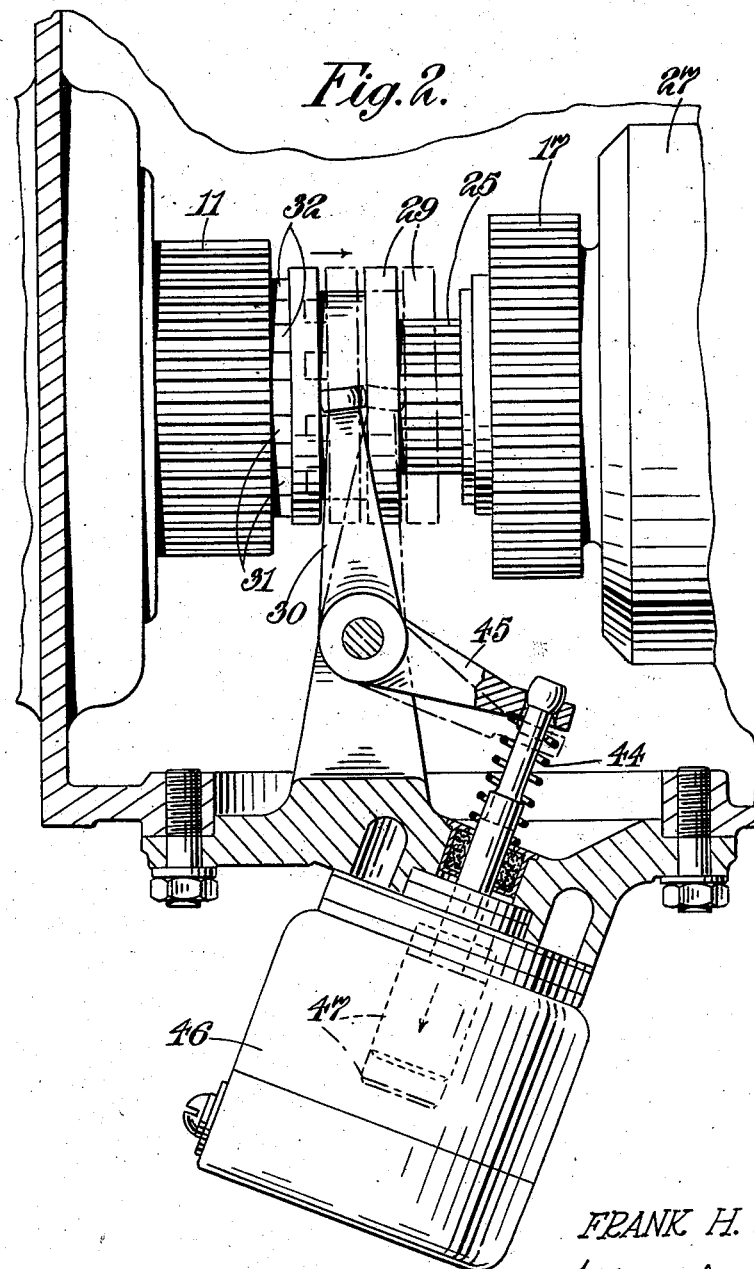

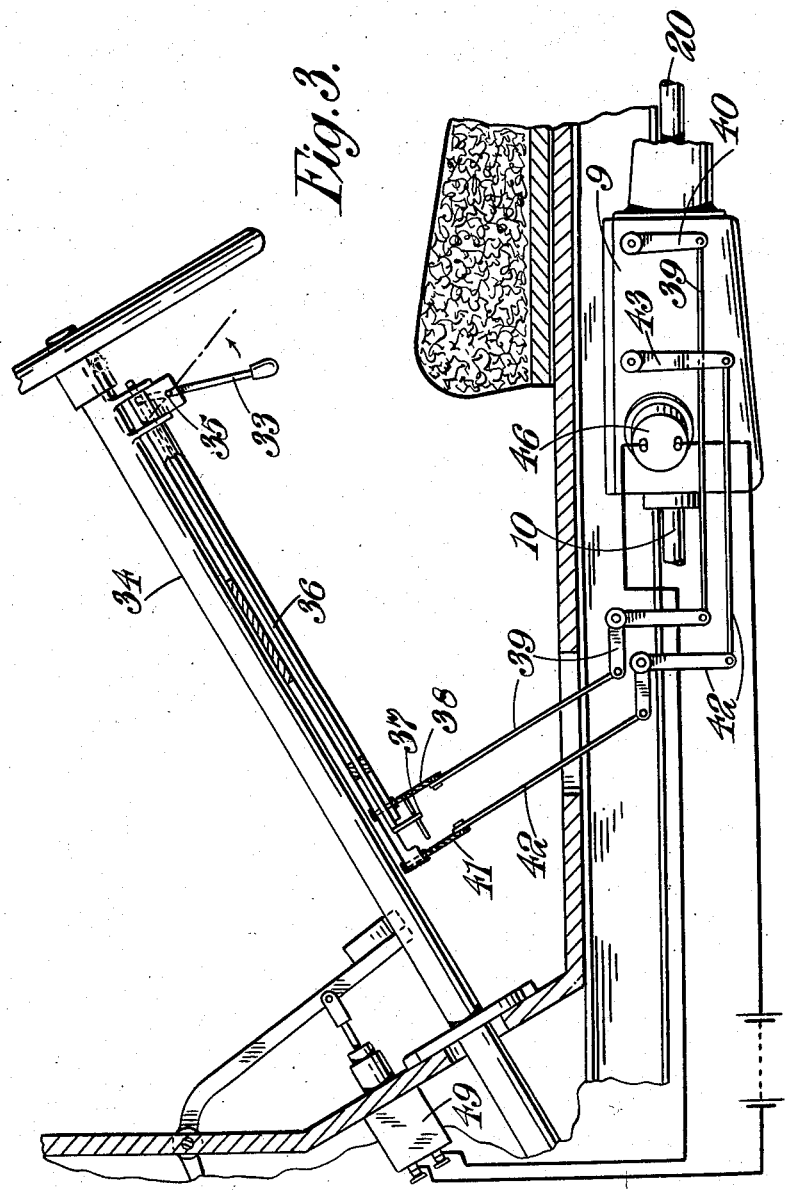

2,504,904

UNITED STATES PATENT OFFICE 2,504,904

CHANGE-SPEED GEAR FOR MOTOR VEHICLES

Frank Henry Tarlton, Alvaston, England, assignor to Rolls-Royce Limited, Derby, England, a British company Application August 11, 1947, Serial No. 767,903
In Great Britain August 19, 1946

8 Claims. (Cl. 74—472)

1

This invention relates to change-speed-gears for motor vehicles and has for its object to provide an improved construction and arrangement of such gears.

It is desirable to arrange that the control-lever for the change-speed-gear should be mounted on the steering column of the vehicle, and whilst certain constructions have proved practicable they have been limited to 3-speed gears.

Difficulties arise, however, when the engine of the vehicle, which carries the gear-box is provided with a flexible mounting and it is an object of this invention to provide a construction and arrangement of gear which will enable a 4-speed gear-box to be used, and also to provide a practicable control system with a flexibly mounted engine.

It will be understood, however, that the improved gear-box and control can be used in other circumstances if so desired.

According to this invention, there is provided in a change-speed-gear for motor vehicles, the combination with an input shaft, an output shaft, a lay shaft, and trains of gears with different ratios on them, arranged for selective engagement, of a free-wheel or other over-running coupling, whereof the driven member can be rotatively engaged with the output shaft and whereof the driving member is engaged with a gear-wheel driven by the input shaft, and means for coupling at will the free-wheel-driven-member directly or indirectly with the input shaft so as to be driven by it at a higher speed than its co-operating driving member.

According to another feature of this invention, the said gear-wheel is used for the gear-ratio next to the highest ratio, and the said coupling-means is arranged to engage the input shaft to give a 1 to 1 ratio of transmission.

This invention also covers a construction of change-speed-gear providing three or more ratios of transmission, wherein the arrangement above set forth is applied to more than two of the ratios.

According to yet another feature of this invention, the control of the said coupling-means is independent of the normal gear-ratio-selection lever. The coupling-means may be spring-pressed into position to engage the higher gear-ratio and may be provided with a solenoid-control for effecting engagement of the lower gear-ratio. In such an arrangement, means are preferably provided to prevent engaging or disengaging movement of the said coupling means, whilst the coupling is transmitting torque.

The following is a description of a change-speed-gear for a motor vehicle embodying the above and other features of this invention, reference being had to the accompanying drawings in which Figure 1 is a diagrammatic section through a change-speed-gear-box, Fig. 2 is an enlarged view of a part of the change-speed-gear, Figure 3 is a diagrammatic view showing a means for controlling the change-speed-gear, Figure 4 is a detail of the control means, and Figure 5 is a diagrammatic view of a modified construction of change-speed-gear.

Referring to Figures 1 to 3 of the drawings, the change-speed-gear 9 is of normal construction in so far as it comprises an input shaft 10 carrying a gear-wheel 11 constantly meshing with a gear-wheel 12 carried on a lay shaft 13. The lay shaft 13 carries 3 further gear-wheels 14, 15, 16 which respectively drive gears 17, 18, 19 mounted co-axially with an output shaft 20. A reversing train 21 is provided and reverse neutral and first or lowest gears are selected by sliding gear-wheel 19 on the output shaft by means of fork 22. A synchromesh coupling (indicated generally by reference 23) is provided for engaging the second gear ratio and is also used for engaging the 3rd and 4th alternative gear ratios by its alternative setting, the sliding dog of the synchromesh coupling 23 being controlled by fork 24.

The manner in which the 3rd and 4th gear ratios are obtained according to this invention will now be described.

The gear wheel 17 is rotatively mounted on a hollow shaft 25 which is in turn rotatively mounted on the output shaft 20. The gear-wheel 17 is formed in one piece with the driving member 26 of a free-wheel over-running coupling, the driven-member 27 of which is secured on the hollow shaft 25, driving connection between the members 26 and 27 being obtained by rollers 28 or like locking elements. Thus the gear-wheel 17 may drive the hollow shaft 25, or alternatively the hollow shaft 25 can over-run the gear-wheel 17 if the hollow shaft 25 is driven at a higher speed than the gear-wheel 17.

The hollow shaft 25 has splined on it a sliding sleeve 29 which moves under control of a fork 30 between a position (Figure 1) in which teeth 31 on the sleeve 29 engage co-operating teeth 32 on the input shaft 10 so that the hollow shaft 25 is driven directly by the input shaft 10 and a position indicated in chain lines in Figure 2 in which the teeth 31, 32 are disengaged. In this position the sleeve 29 has no driving connection with other parts of the gear.

The control or selection of the transmission ratio in the gear-box is illustrated as being by means of a gear-change-lever 33 mounted on the steering column 34 of a motor vehicle. With such an arrangement, difficulties arise when the engine of the vehicle, which carries the gear-box, is provided with a flexible mounting, and when the gear-box is provided to give more than three forward speeds.

These difficulties are overcome by this invention by arranging that the section between 3rd and 4th gear ratios is effected independently of the gear-change-lever 33.

Referring now to Figures 3 and 4, the selection of Reverse, Neutral and 1st, 2nd and High gears is controlled by the lever 33 which is arranged to rock about a pivot 35 between two selected positions and to rotate the connecting rod 36 about its axis. In one of the selected positions a clutch member 37 is engaged with a rocking lever 38 such that on rotation of the rod 36 lever 38 is rocked and through a suitable linkage 39 rocks an arm 40 carried on the spindle of fork 22 (Figure 1) to move gear-wheel 19 between Reverse, Neutral and 1st gear positions. In the other of the selected positions the clutch member 37 engages with a rocking lever 41 which is connected by a linkage 42 to an arm 43 on the spindle of fork 24 so that on rotation of the rod 36 the fork 24 moves the sliding dog of the synchromesh coupling 23 between 2nd gear, Neutral or High gear positions.

The fork 30 for controlling the sliding sleeve 29 (Figures 1 and 2) is spring-pressed into the coupling position by a spring 44 acting on an arm 45 of the fork 30. The arm 45 is also coupled to the armature 47 of a solenoid device 46 which when energised rocks the fork 30 about its pivot 48 to move the sleeve 29 to the disengaged position. The solenoid is energized by closing of a switch 49 under control of a throttle-control-pedal 50, the arrangement being such that the switch is closed by depression of the pedal 50 beyond the full throttle position.

Thus Reverse, Neutral, 1st, 2nd and High gear ratios are selected in the usual manner by control lever 33, the movement of the lever 33 into the High gear position merely engaging the synchromesh coupling with driven-member 27 of the free-wheel coupling. In this position, a drive is transmitted from the input shaft 10 through the lay shaft 13 to the gear-wheels 14, 17 for the 3rd speed and it drives, through the free-wheel couplings 26, 27, 28, the driven-member 27, and hollow shaft 25 and this is engaged through the synchromesh coupling with the output shaft 20, therefore giving a drive from the input to the output shaft at the 3rd speed. In this setting, the sliding sleeve is withheld from engagement with the input shaft by the solenoid 46. When it is desired to obtain the highest ratio, the solenoid 46 is de-energized and the spring 44 moves the sliding sleeve 29 into engagement with the input shaft 10. The hollow shaft 25 is thereby driven at the same speed as the input shaft 10 and over-runs the free-wheel connection with the 3rd speed gear-wheel and the drive is transmitted as before from this driven-member 27 through the synchromesh coupling 23 to the output shaft 20.

The change-up from 3rd speed to 4th speed is made under the control of the pedal-operated switch is intended to take place when the engine throttle is closed or partly closed so that a period of low or zero torque occurs during which the change can be effected.

Similarly, during the change-down from 4th speed to 3rd speed, the throttle is held wide open but the energising of the solenoid is also used momentarily to interrupt the engine ignition, thereby again providing a period of low or zero torque.

It will be observed that although a free-wheel connection is employed in the transmission, it does not necessarily enable the vehicle to over-run the engines since if the control by means of the accelerator or throttle-pedal 50 as above-mentioned is used, the release or pressure on the pedal automatically brings the top gear into operation. A governor, however, may be incorporated to prevent over-spending of the engine if so desired.

The throttle-control-pedal control may conveniently be a device in which the pedal 50 is connected to the switch 49 through means such as a dash-pot 51 having a bleed-hole 52. With such an arrangement, when the pedal 50 is slowly raised or depressed the piston 53 of the dash-pot travels within the dash-pot without operating the switch 49. If, however, the pedal 50 is rapidly raised or depressed, air cannot enter or be expelled with sufficient rapidity to accommodate movements of the piston 53 so that the switch is operated. In this way, selection of 3rd or 4th gears is readily controlled by the pedal while permitting normal control of the throttle in 3rd and 4th gears.

If desired instead of the arrangement above-described for selecting 3rd or 4th gear ratios, the movement of the sliding sleeve 29 may be controlled hydraulically, pneumatically or mechanically by a lever independent of the main gear-change-lever 33.

Another result of the use of the free-wheel of the 3rd speed is that if the vehicle be allowed to stand facing up an incline on any gear ratio except third, if the vehicle tries to run backwards two gears will automatically become engaged simultaneously. In other words the gear-box will act as a sprag and will lock the gear-lever from any movement. This can be avoided by providing means as described in the specifications of British patent application No. 31,776/46 or concurrent U. S. Patent application Serial No. 38,231 for holding the free-wheel coupling in its free position on reverse rotation.

In the above-described arrangement for controlling the sliding sleeve it is preferable that neither the spring nor the solenoid should be sufficiently powerful to move the sleeve whilst torque is being transmitted, and for this purpose an "interceptor" is provided to ensure that the engagement is completed only when the co-operating parts are synchronised. This device may be of the kind described in the specification of concurrent patent application Serial No. 767,904 or any other suitable device may be used.

Referring now to Figure 5, there is illustrated diagrammatically a portion of a change-speed-gear in which a free-wheel or over-running coupling is provided in two gear trains. In this figure the same references as were used in Figures 1 and 2 are used to indicate the parts of two Top gear ratios, but between the synchromesh coupling 23 and these parts there is provided a further gear-wheel 114 on the lay shaft 13 meshing with a gear-wheel 117 carrying the driving member 126 of the free-wheel coupling, the driven-member 127 of which is carried by a hollow shaft 125 rotatively mounted on the output shaft 20. Locking members such as rollers 128 are provided between the members 126 and 127. The hollow shaft 125 has splined on it a sliding sleeve 129 which may be moved in a manner similar to that described with reference to sleeve 29 between a position in which its teeth 131 engage teeth 132 on member 27 and a position in which these teeth are disengaged. Separate solenoids and control springs will be provided for each of the sleeves 29, 129.

With this construction, when the synchromesh coupling 23 and the sleeves 29, 129 are all engaged, a direct drive is obtained between shafts 10 and 20, both free-wheel driven-members 27, 127 over-running the driving members 26, 126. On disengagement of sleeve 29 a lower gear is obtained through gear-wheels 14, 17 and free-wheel couplings 26, 27, the free-wheel couplings 126, 127 over-running. On disengagement of both sleeves 29 and 129, a still lower gear ratio is obtained through gear wheels 114, 117 and free-wheel couplings 126, 127, the other free-wheel coupling being inoperative.

As described with reference to the first construction, there may be provided means for preventing sprag action for each free-wheel coupling and means for ensuring synchronism of the sliding sleeves 29, 129 and their co-operating parts on engagement.

The control of the solenoids for withdrawing the sleeves 29, 129 is conveniently effected by pedal-operated switches. One suitable arrangement comprises a pair of switches, one actuated by the throttle pedal as above described to control the sleeve 29 and the second located in a position adjacent the throttle pedal so as to be operable by the heel of the operator without affecting the operation of the throttle pedal to control sleeve 129.

The construction described with reference to Figure 5 may be conveniently applied to a 4-speed gear-box and in this case the main gear lever would have only three operative positions, viz., Reverse, 1st gear and High, and in the selection between 2nd, 3rd and 4th gears would be effected by means of the sliding sleeves 29, 129 under control of pedal-operated switches.

I claim:

1. In a change-speed gear, the combination of an input shaft, an output shaft co-axial with said input shaft, a lay shaft, a driving gear wheel mounted for rotation with said input shaft, a driven lay gear wheel meshed with said driving gear wheel and mounted for rotation with said layshaft, a first lay gear wheel, a second lay gear wheel, a third lay gear wheel, said first, second and third lay gear wheels being mounted for rotation with said lay-shaft, and said third lay gear wheel being located next adjacent to said driven lay gear wheel, a first driven gear wheel mounted for rotation with said driven shaft and meshable at will with said first lay gear wheel, a second driven gear wheel mounted for rotation about said driven shaft and meshed with said second lay gear wheel, a first clutch element on said second driven gear wheel, a second clutch element mounted for rotation with said driven shaft and engageable at will with said first clutch element to establish said second driven gear wheel in driving engagement with said driven shaft, a third driven gear wheel meshed with said third lay gear wheel and mounted for rotation about said driven shaft, an over-running clutch having a driving element mounted for rotation with said third driven gear wheel, and a driven element, a third clutch element mounted for rotation with said driven element, a fourth clutch element mounted for rotation with said driven shaft and engageable at will with said third clutch element to establish said driven element in driving relationship with said driven shaft, a fifth clutch element mounted for rotation with said input shaft, and a sixth clutch element mounted for rotation with said driven element and engageable at will with said fifth clutch element to establish said input shaft in direct driving relationship with said driven element, the speed ratio of said input shaft to said driven element being greater when drive is transmitted through said over-running clutch than when said input shaft and said driven element are in direct driving relationship.

2. A change-speed gear according to claim 1 wherein said second clutch element and said fourth clutch element are secured on a structure common to both of them, said structure being mounted for rotation with said driven shaft and to be axially movable along said driven shaft between a first position wherein said second clutch element is engaged with said first clutch element and a second position wherein said fourth clutch element is engaged with said third clutch element, said change speed gear further comprising first operator operable means for moving said structure between said two positions.

3. A change speed gear according to claim 2 wherein said first driven gear wheel is mounted for axial movement along said driven shaft into and out of a position wherein it is in mesh with said first lay gear wheel, said change speed gear further comprising second operator operable means for moving said first driven gear wheel axially along said driven shaft.

4. A change speed gear according to claim 3 wherein said two operator operable means comprise an operator operable member common to both of them.

5. A change speed gear according to claim 4 wherein said two operator operable means each comprises a collar surrounding said driven shaft and a mechanical linkage whereof one end is connected to said collar and the other end is movable by said common operator operable member.

6. A change speed gear according to claim 5 wherein said sixth clutch element is mounted for axial movement with respect to said driven shaft into and out of engagement with said fifth clutch element, said change speed gear further comprising third operator operable means for moving said sixth clutch element into and out of engagement with said fifth clutch element.

7. A change speed gear according to claim 6, wherein said third operator operable means is independent of said first operator operable means and said second operator operable means.

8. An automobile vehicle having a change speed gear according to claim 7, a steering column, and an accelerator pedal, and wherein said operator operable member common to said first and said second operator operable means is mounted on said stearing column, and wherein said third operator operable means comprises said accelerator pedal.

FRANK HENRY TARLTON.

(References on following page)

REFERENCES CITED

The following references are of record in the file of this patent:

UNITED STATES PATENTS

| Number | Name | Date |
|---|---|---|
| 1,980,505 | Snow | Nov. 13, 1934 |
| 2,231,876 | Beltz | Feb. 18, 1941 |
| 2,261,898 | Barkeij | Nov. 4, 1941 |
| 2,309,864 | Patterson | Feb. 2, 1943 |
| 2,333,682 | Schneider | Nov. 9, 1943 |
| 2,343,304 | LaBrie | Mar. 7, 1944 |
| 2,378,385 | Banker | June 19, 1945 |

FOREIGN PATENTS

| Number | Country | Date |
|---|---|---|
| 407,487 | Great Britain | Mar. 22, 1934 |